United States Patent
Tsuchiya et al.

(10) Patent No.: US 10,242,759 B2
(45) Date of Patent: Mar. 26, 2019

(54) CONTROL ROD DRIVE MECHANISM

(71) Applicant: Hitachi-GE Nuclear Energy, Ltd., Hitachi-shi, Ibaraki (JP)

(72) Inventors: Takahiro Tsuchiya, Hitachi (JP); Toshihiro Kodama, Hitachi (JP); Hirokazu Akatsuka, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 576 days.

(21) Appl. No.: 14/625,827

(22) Filed: Feb. 19, 2015

(65) Prior Publication Data

US 2015/0255178 A1 Sep. 10, 2015

(30) Foreign Application Priority Data

Mar. 7, 2014 (JP) .................................. 2014-044931

(51) Int. Cl.
*G21C 7/14* (2006.01)
*F16H 25/22* (2006.01)
(Continued)

(52) U.S. Cl.
CPC ........... *G21C 7/14* (2013.01); *F16H 25/2204* (2013.01); *H02K 7/11* (2013.01);
(Continued)

(58) Field of Classification Search
CPC ... G21C 7/14; G21C 7/00; G21C 7/06; G21C 7/08; G21C 7/12; F16H 25/2204; H02K 7/11; H02K 7/06; H02K 49/106
(Continued)

(56) References Cited

U.S. PATENT DOCUMENTS

| 5,089,211 | A * | 2/1992 | Dillmann | ................. | G21C 7/12 376/228 |
| 2009/0185651 | A1* | 7/2009 | Akatsuka | ................. | G21C 7/14 376/258 |
| 2011/0239797 | A1* | 10/2011 | Akatsuka | ................. | G21C 7/14 74/395 |

FOREIGN PATENT DOCUMENTS

| JP | 60-47987 A | 3/1985 |
| JP | 8-82690 A | 3/1996 |

(Continued)

OTHER PUBLICATIONS

Japanese-language Office Action issued in counterpart Japanese Application No. 2014-044931 dated Apr. 4, 2017 with English translation (3 pages).

*Primary Examiner* — Lily C Garner
(74) *Attorney, Agent, or Firm* — Crowell & Moring LLP

(57) ABSTRACT

A control rod drive mechanism includes an outer tube and a guide tube which is arranged in the outer tube and is held by the outer tube. Furthermore, the control rod drive mechanism includes a spool piece with an inner magnet coupling and a rotary shaft connected to the inner magnet coupling arranged internally. The lower end portion of the outer tube is supported by the spool piece in the spool piece. The outside diameter of the outer tube, through the length of the outer tube, is smaller than the inside diameter of the spool piece and the outer tube, in the radial direction of the outer tube, is not projected outside the inner surface of the spool piece. Therefore, the installation places of the O-rings which are a seal member are reduced and the time required for maintenance of the control rod drive mechanism can be shortened.

2 Claims, 5 Drawing Sheets

(51) Int. Cl.
*H02K 7/11* (2006.01)
*H02K 7/06* (2006.01)
*F16H 25/20* (2006.01)

(52) U.S. Cl.
CPC ........ *F16H 2025/2075* (2013.01); *H02K 7/06* (2013.01); *Y02E 30/31* (2013.01); *Y02E 30/39* (2013.01)

(58) Field of Classification Search
USPC ........................................................ 376/228
See application file for complete search history.

(56) References Cited

FOREIGN PATENT DOCUMENTS

| | | | |
|---|---|---|---|
| JP | 10-132977 | A | 5/1998 |
| JP | 11-281785 | A | 10/1999 |
| JP | 2000-214288 | A | 8/2000 |
| JP | 2000214288 | A * | 8/2000 |
| JP | 2007-232422 | A | 9/2007 |
| JP | 2009-174941 | A | 8/2009 |
| JP | 2011-209253 | A | 10/2011 |

* cited by examiner

CONTROL ROD DRIVE MECHANISM

CLAIM OF PRIORITY

The present application claims priority from Japanese Patent application serial no. 2014-044931, filed on Mar. 7, 2014, the content of which is hereby incorporated by reference into this application.

BACKGROUND OF THE INVENTION

Technical Field

The present invention relates to a control rod drive mechanism and more particularly relates to a control rod drive mechanism suitably applicable to a boiling water reactor.

Background Art

A boiling water reactor includes a reactor pressure vessel, and a core shroud, an upper lattice plate, a core support plate, a separator, and a steam dryer installed in the reactor pressure vessel. A core in which a plurality of fuel assemblies are loaded is surrounded by the core shroud. A core support plate is disposed below the core and is attached to the core shroud. An upper lattice plate is disposed above the core and is attached to the core shroud. The core is disposed between the core support plate and the upper lattice plate. The separator is disposed above the upper lattice plate and the steam dryer is disposed above the separator.

A lower end of each fuel assembly loaded in the core is supported by a plurality of fuel supports installed on the core support plate. The upper end of each fuel assembly is supported by the upper lattice plate.

A plurality of control rods withdrawing from and inserting into among the fuel assemblies in order to control the reactor power are disposed in the reactor pressure vessel. These control rods are respectively connected to control rod drive mechanisms. Each control rod drive mechanism is stored separately in a control rod drive mechanism housing installed at the bottom of the reactor pressure vessel. Cooling water serving as moderator and coolant is filled in the reactor pressure vessel.

An example of the control rod drive mechanism used in the boiling water reactor is described in Japanese Patent Laid-Open No. 10(1998)-132977. The control rod drive mechanism includes an outer tube, a guide tube, a piston tube, a ball screw, a ball nut, a spool piece, an inner magnet coupling, an outer magnet coupling, and a motor. A flange of the outer tube is attached to a flange of the spool piece by a plurality of bolts, as described in FIG. 1 of Japanese Patent Laid-Open No. 10(1998)-132977. The guide tube is disposed in the outer tube and a lower end of the guide tube is supported by the outer tube. The piston tube is disposed in the guide tube. The ball screw is inserted in a hollow portion formed around a central axis of the piston tube. The ball nut mates with the ball screw and a lower end of the piston tube is put on a top face of the ball nut. An upper end portion of the piston tube is coupled removably to a lower end portion of the control rod. A back sheet is provided in the lower end portion of the ball screw. The back sheet is disposed opposite to a top face of the back sheet receiving portion installed inside the outer tube in the lower end portion of the outer tube. In the normal state of each control rod drive mechanism, a gap is formed between an undersurface of the back sheet and the top face of the back sheet receiving portion, and the undersurface of the back sheet is not in contact with the top face of the back sheet receiving portion.

An inner magnet coupling to which a rotary shaft is attached is disposed inside the spool piece attached to the outer tube. The rotary shaft is connected removably to the back sheet.

A cylindrical outer magnet coupling is disposed so as to surround a lower end portion of the spool piece. The outer magnet coupling is connected to the rotary shaft of the motor attached to the spool piece by the support member. An outer magnet installed on the inner surface of the outer magnet coupling is opposite to an inner magnet installed on the outer surface of an inner magnet bearing and a side wall of the spool piece is disposed between the inner magnet and the outer magnet.

The outer tube of the control rod drive mechanism is inserted into the control rod drive mechanism housing installed on a bottom head of the reactor pressure vessel and the flange of the outer tube and the flange of the spool piece which are connected by a bolt are attached to the flange of the control rod drive mechanism housing by other a plurality of bolts (refer to FIG. 1 of Japanese Patent Laid-Open No. 10(1998)-132977).

The control rod drive mechanism shown in FIG. 1 of Japanese Patent Laid-Open No. 10(1998)-132977 does not require a rotary shaft for connecting a inner magnet coupling and an outer magnet coupling and spool piece forms a pressure boundary and prevents cooling water in the reactor pressure vessel from leaking to the outside. Particularly, an O-ring disposed between the flange of the control rod drive mechanism housing and the flange of the spool piece and an O-ring arranged between the flange of the outer tube and the flange of the spool piece prevent the cooling water from leaking to the outside.

The rotary power of the motor is transmitted to the inner magnet coupling by the outer magnet coupling to rotate the ball screw. The ball nut moves up and down by the rotation of the ball screw and by doing this, the control rod is inserted into the core or is withdrawn from the core.

In the control rod drive mechanism shown in FIG. 1 of Japanese Patent Laid-Open No. 10(1998)-132977, as mentioned above, the flange of the outer tube and the flange of the spool piece which are combined by a bolt are attached to the flange of the control rod drive mechanism housing by other a plurality of bolts. On the other hand, in the control rod drive mechanism shown in FIG. 1 of Japanese Patent Laid-Open No. 10(1998)-132977, as shown in FIG. 5 of Japanese Patent Laid-Open No. 10(1998)-132977, in the state that the flange of the outer tube is attached to the flange of the control rod drive mechanism housing by a bolt, the flange of the spool piece may be attached to the flange of the control rod drive mechanism housing by another bolt. In such a structure, an O-ring is disposed between the flange of the control rod drive mechanism housing and the flange of the outer tube and furthermore, an O-ring is disposed between the outer surface of the outer tube and the inner surface of the spool piece.

Also in Japanese Patent Laid-Open No. 8(1996)-82690, a control rod drive mechanism having the same structure as that of the aforementioned control rod drive mechanism described in Japanese Patent Laid-Open No. 10(1998)-132977 is described.

Also in the control rod drive mechanism described in Japanese Patent Laid-Open No. 60(1985)-47987, the ball screw is rotated by the motor and the ball nut mating with the ball screw moves up and down. As a result, the control rod is inserted into the core or is withdrawn from the core. In the control rod drive mechanism, the flange existing in the upper end portion of the cylindrical spool piece is attached to the flange of the control rod drive mechanism housing and a cylinder body is attached to the flange in the lower end portion of the spool piece. The lower end of the guide tube of the control rod drive mechanism is put on the top face of the cylinder body and the guide tube is supported by the cylinder body.

CITATION LIST

Patent Literature

[Patent Literature 1] Japanese Patent Laid-Open No. 10 (1998)-132977
[Patent Literature 2] Japanese Patent Laid-Open No. 8(1996)-82690
[Patent Literature 3] Japanese Patent Laid-Open No. 60 (1985)-47987

SUMMARY OF THE INVENTION

Technical Problem

In the conventional control rod drive mechanism (for example, the control rod drive mechanism shown in FIG. 1 of Japanese Patent Laid-Open No. 10(1998)-132977) driven by motor which is applied to the boiling water reactor, an O-ring made of rubber is installed between the flange of the outer tube and the flange of the spool piece. For the O-ring, it is necessary to remove the spool piece from the outer tube and replace it with a new O-ring at a predetermined frequency (for example, once per 10 years) from the viewpoint of the life span of the raw material. To remove the spool piece from the outer tube, it must remove the bolt for connecting the flange of the control rod drive mechanism housing and the flange of the spool piece by applying crushing force to the O-ring made of metal which is disposed between the flange of the control rod drive mechanism housing and the flange of the outer tube and holds the airtightness between the flanges.

As a result, when attaching the spool piece to the control rod drive mechanism housing by a bolt after replacing the O-ring disposed between the flange of the outer tube and the flange of the spool piece, it is necessary to confirm the gap between the control rod drive mechanism housing and the flange of the outer tube to confirm the crushing condition of the O-ring made of metal.

In the control rod drive mechanism shown in FIG. 1 of Japanese Patent Laid-Open No. 10(1998)-132977, as aforementioned, the flange of the outer tube and the flange of the spool piece which are connected with each other, are attached to the flange of the control rod drive mechanism housing by other a plurality of bolts. Even when the connection structure of such 3 flanges in the control rod drive mechanism shown in FIG. 1 of Japanese Patent Laid-Open No. 10(1998)-132977 is exchanged for a connection structure of such 3 flanges in the control rod drive mechanism shown in FIG. 5 of Japanese Patent Laid-Open No. 10(1998)-132977, that is, a connection structure where the flange of the spool piece is attached to the flange of the control rod drive mechanism housing by another bolt in the state that the flange of the outer tube is attached to the flange of the control rod drive mechanism housing by a bolt, and even, it is necessary to remove the bolt for connecting the flange of the control rod drive mechanism housing and the flange of the spool piece when exchanging the O-ring disposed between the outer surface of the outer tube and the inner surface of the spool piece. Therefore, even in this case, it is necessary to confirm a gap between the control rod drive mechanism housing and the flange of the outer tube to confirm the crushing condition of the O-ring made of metal similarly to the aforementioned case.

Furthermore, in the control rod drive mechanism driven by motor, the outer magnet coupling and the inner magnet coupling are used to transmit the rotary power of the motor to the ball screw. The outer magnet coupling and the inner magnet coupling basically do not require maintenance, so that only for the maintenance of the O-ring disposed between the flange of the outer tube and the flange of the spool piece, the spool piece needs to be removed from the control rod drive mechanism housing and the outer tube. As a result, the time required for the maintenance operation of the O-ring becomes longer.

An object of the present invention is to provide a control rod drive mechanism capable of shortening the time required for maintenance.

Solution to Problem

A feature of the present invention for attaining the above object is a control rod drive mechanism comprising an outer tube, a guide tube disposed in the outer tube, a spool piece in which a lower end portion of the outer tube is inserted, and supporting the outer tube and the guide tube, an inner magnet coupling disposed in the spool piece, a ball screw which is rotated by the inner magnet coupling and is disposed in the guide tube, a ball nut mating with the ball screw, a piston tube which is put on the ball nut and is connected to a control rod, a motor disposed below the spool piece and attached removably to the spool piece, and an outer magnet coupling which is disposed outside said spool piece, is connected to a rotary shaft of the motor, and is disposed opposite to the inner magnet coupling across the spool piece, Wherein an outside diameter of the outer tube is smaller than an inside diameter of the spool piece through an entire length of the outer tube and the outer tube has a structure that it is not projected outside an inner surface of the spool piece in a radial direction of the outer tube.

According to the present invention, the outside diameter of the outer tube is smaller than the inside diameter of the spool piece through an entire length of the outer tube and the outer tube has the structure that it is not projected outside the inner surface of the spool piece in the radial direction of the outer tube, so that it becomes unnecessary to dispose O-rings which are a seal member between the outer surface of the outer tube and the inner surface of the spool piece, and further, it becomes unnecessary to remove the spool piece from a control rod drive mechanism housing only for the maintenance of the O-rings. Thus, the time required for maintenance of the control rod drive mechanism can be shortened.

Advantageous Effect of the Invention

According to the present invention, the time required for maintenance of the control rod drive mechanism can be shortened.

DETAILED DESCRIPTION OF THE PREFERRED EMBODIMENTS

Embodiments of the present invention will be explained below.

Embodiment 1

A control rod drive mechanism according to 1 which is a preferred embodiment of the present invention will be explained by referring to FIG. 2.

Figure 1:
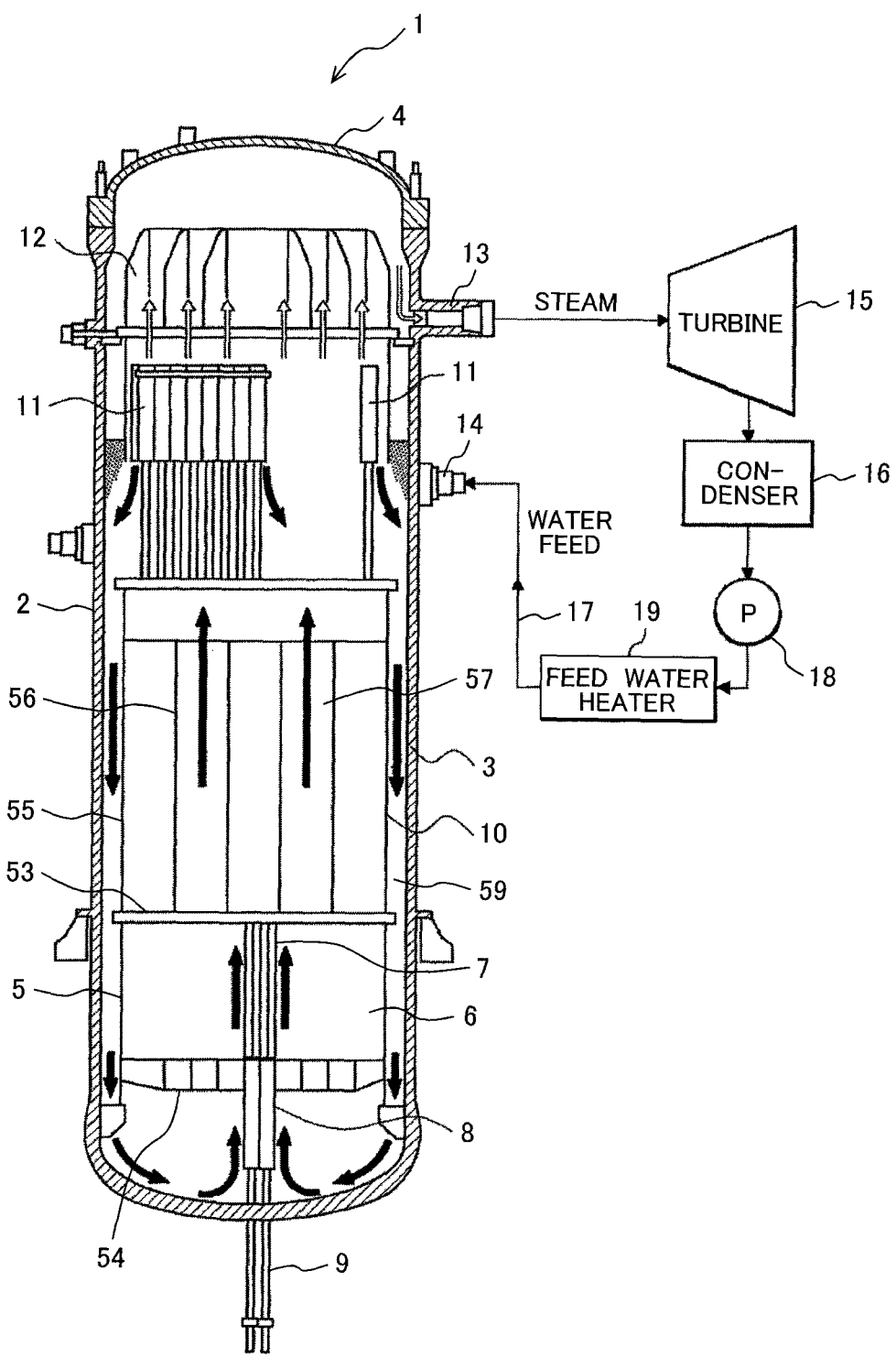
FIG. 1 is a structural diagram showing a boiling water nuclear power generation plant.

Before explanation of the control rod drive mechanism of the present embodiment, a rough structure of the boiling water nuclear power generation plant to which the control rod drive mechanism of the present embodiment is applied will be explained by referring to FIG. 1.

The boiling water nuclear power generation plant is divided into two such as a forced circulation boiling water nuclear power generation plant and a natural circulation nuclear power generation plant depending on supply form of the cooling water to the core. In the forced circulation boiling water nuclear power generation plant, the cooling water is supplied forcedly to the core by driving of a recirculation pump (or an internal pump) installed in the reactor. In the natural circulation nuclear power generation plant, in the reactor, the recirculation pump or the internal pump is not installed and the cooling water is supplied to the core by the natural circulation. A chimney is installed in the reactor to increase the natural circulation force of the cooling water.

The control rod drive mechanism of the present embodiment can be applied to the respective reactors of the forced circulation boiling water nuclear power generation plant and the natural circulation nuclear power generation plant. Here, the structure of the natural circulation nuclear power generation plant to which the control rod drive mechanism of the present embodiment is applied will be explained by referring to FIG. 1.

A natural circulation nuclear power generation plant 1 includes a reactor 2, a turbine 15, and a condenser 16. The reactor 2 has a reactor pressure vessel 3 and a core shroud 5, an upper lattice plate 53, a core support plate 54, a chimney 10, a separator 11, and a dryer 12 are installed in the reactor pressure vessel 3. At least, when the natural circulation nuclear power generation plant 1 is in operation, the reactor pressure vessel 3 is attached with a cover 4 on the upper end portion thereof to be sealed up. A core 6 disposed in the reactor pressure vessel 3 and in which a plurality of fuel assemblies 7 are loaded is surrounded by the core shroud 5. The core support plate 54 is disposed below the core 6 and is attached to the core shroud 5. The upper lattice plate 53 is disposed above the core 6 and is attached to the core shroud 5. The core 6 is disposed between the core support plate 54 and the upper lattice plate 53.

A lower end portion of each fuel assembly 7 loaded in the core 6 is supported by a plurality of fuel supports (not drawn) installed on the core support plate 54. An upper end portion of each fuel assembly 7 is supported by the upper lattice plate 53.

The chimney 10 disposed above the upper lattice plate 53 includes a cylindrical outer pipe 55 and a lattice member 56. The outer pipe 55 is attached to the upper end of the core shroud 5. The lattice member 56 is disposed in the outer pipe 55 and is attached to the inner surface of the outer pipe 55. The lattice member 56 is structured so as to combine a plurality of partition plates in the lattice shape and is extended from a lower end of the outer pipe 55 up to an upper end of the outer pipe 55. A plurality of coolant paths 57 with a square cross section are formed in the outer pipe 55 by the lattice member 56. The separator 11 is disposed above the chimney 10 and the dryer 12 is disposed above the separator 11.

A plurality of control rod guide pipes 8 are arranged below the core 6 in the reactor pressure vessel 3. A plurality of control rod drive mechanism housings 9 pass through a bottom head of the reactor pressure vessel 3 and are attached to the reactor pressure vessel 3. A lower end of each control rod guide pipe 8 is connected to an upper end of each control rod drive mechanism housing 9.

A plurality of control rods 20 (refer to FIG. 2) inserted in and withdrawn from among the fuel assemblies 7 loaded in the core 6 for controlling the reactor power are separately disposed in the respective control rod guide pipes 8. Each lower end portion of these control rods 8 is coupled removably and individually to each upper end portion of the control rod drive mechanisms 21. Each control rod drive mechanism 21 is separately stored in the control rod drive mechanism housings 9. Cooling water serving as moderator and coolant is filled in the reactor pressure vessel 3.

The turbine 15 is connected to a nozzle 13 formed in the reactor pressure vessel 3 by a main steam pipe 58. The condenser 16 is disposed below the turbine 15 and is connected to a nozzle 14 by a water feed pipe 17. A water feed pump 18 and a feed water heater 19 are installed on the water feed pipe 17.

The necessary number of control rods 20 are withdrawn from the core 6 by the respective control rod drive mechanisms 21 and as the result, the reactor power of the natural circulation nuclear power generation plant 1 rises up to 100% power which is the rated power. Thereafter, the natural circulation nuclear power generation plant 1 is operated practically in 100% power until one operation cycle finishes. When the natural circulation nuclear power generation plant 1 is in operation, the cooling water supplied to the core 6 flows in the respective fuel assemblies 7, and is heated by heat generated by nuclear fission of a nuclear fuel material in a plurality of fuel rods included in each fuel assembly 7, and a part thereof becomes steam. As a result, a gas-liquid two-phase flow including cooling water and steam rises in each fuel assembly 7.

The gas-liquid two-phase flow rises in the respective coolant paths 57 formed in the chimney 10 and flows into the separator 11. The separator 11 separates the cooling water and steam included in the flowed-in gas-liquid two-phase flow. The separated steam flows into the dryer 12 and furthermore moisture is removed by the dryer 12. The steam from which the moisture is removed is discharged into the main steam pipe 58 from the dryer 12. This steam (saturated steam) is introduced to the turbine 15 to rotate the turbine 15.

The generator (not drawn) coupled with the turbine 15 is also rotated to generate electric power.

The steam discharged from the turbine 15 is condensed to water by the condenser 16. The water is supplied into the reactor pressure vessel 3 through the water feed pipe 17 as feed water. The feed water is pressurized by the water feed pump 18, is heated by the feed water heater 19, rises in temperature, and then is introduced into the reactor pressure vessel 3.

The feed water supplied into the reactor pressure vessel 3 by the water feed pipe 17 is mixed with the cooling water separated by the separator 11 in the reactor pressure vessel 3. The cooling water mixed with the feed water flows into a downcomer 59 with an annular cross section which is formed between the inner surface of the reactor pressure vessel 3 and the respective outer surfaces of the outer pipe 55 of the chimney 10 and the core shroud 5. The cooling water moves down in the downcomer 59 and is supplied into each fuel assembly 7 in the core 6.

The supply of the cooling water into each fuel assembly 7 is performed by natural circulation of the cooling water. The natural circulation force of the cooling water is generated due to the density difference between the gas-liquid two-phase flow at a low density rising in the core 6 and the cooling water at a high density moving down in the downcomer 59 and the natural circulation force of the cooling water is more strengthened due to the chimney effect of the chimney 10.

The structure of the control rod drive mechanism 21 of the present embodiment will be explained by referring to FIG. 2.

The control rod drive mechanism 21 includes a piston tube 23, a ball screw 24, a ball nut 26, an outer tube 28, a guide tube 29, a spool piece 34, an inner magnet coupling 35, an outer magnet coupling 40, and a motor 39. The guide tube 29 is disposed in the outer tube 28 and a lower end portion of the guide tube 29 is supported by the outer tube 28. The piston tube 23 is disposed in the guide tube 29. An upper guide 30 is attached to an upper end portion of the outer tube 28. The upper end portion of the guide tube 29 is made smaller in the outside diameter and a disc spring 32 is disposed outside the upper end portion with the outside diameter of the guide tube 29 decreased. The disc spring 32 is disposed between the guide tube 29 and the upper guide 30. A number of 31 indicates a coil spring.

The ball screw 24 is inserted into a hollow portion formed on a central axis of the piston tube 23. The ball nut 26 mates with the ball screw 24 and a lower end of the piston tube 23 is put on the top face of the ball nut 26. An upper end portion of the piston tube 23 is removably coupled to a lower end portion of the control rod 20.

The spool piece 34 is disposed below the control rod drive mechanism housing 9 and a flange 38 of the spool piece 34 is removably attached to a flange 9A of the control rod drive mechanism housing 9 by a plurality of bolts 42. An O-ring 45 made of metal which is a seal member is disposed between the flange 38 of the spool piece 34 and the flange 9A of the control rod drive mechanism housing 9 and the airtightness between the flange 38 of the spool piece 34 and the flange 9A of the control rod drive mechanism housing 9 is held.

The lower end of the outer tube 28 reaches in the spool piece 34 and is supported by a cylindrical support member 48 disposed in the spool piece 34. The outside diameter of the outer tube 28 is smaller than the inside diameter of the spool piece 34 through an entire length of the outer tube 28 and the outer tube 28 can be inserted into the spool piece 34.

Therefore, the outer tube 28 is not projected outside the inner surface of the spool piece 34 in the radial direction of the outer tube 28. The inside diameter of the spool piece 34 is practically equal to the inside diameter of the control rod drive mechanism housing 9.

The magnet couplings include the inner magnet coupling 35 and the outer magnet coupling 40. The inner magnet coupling 35 is disposed in the spool piece 34 and is attached to a rotary shaft 33. A separation detection structure (a gear coupling 36) is attached to the lower end portion of the ball screw 24. The upper end of the rotary shaft 33 is connected removably to the separation detection structure. A coil spring 37 is disposed so as to surround the rotary shaft 33 between a spring support 60 attached to the rotary shaft 33 and the separation detection structure. A bearing case 47 is disposed in the spool piece 34 between the spring support 60 and the inner magnet coupling 35, and is attached to the spool piece 34. The rotary shaft 33 is supported rotatably by a plurality of bearings installed in the bearing case 47.

The motor 39 is disposed below the spool piece 34 and is attached removably to the spool piece 34 by a support member 51. The outer magnet coupling 40 is connected to the rotary shaft of the motor 39 and is disposed between the spool piece 34 and the motor 39. A cylinder portion of the outer magnet coupling 40 is disposed so as to surround the spool piece 34 outside the spool piece 34. The outer magnet installed on the inner surface of the cylinder portion of the outer magnet coupling 40 is opposite to the inner magnet installed on the outer surface of the inner magnet coupling 35 across the side wall of the spool piece 34. The inner surface of the outer magnet coupling 40 is not in contact with the outer surface of the spool piece 34 and a gap is formed between the inner surface of the outer magnet coupling 40 and the outer surface of the spool piece 34. Furthermore, a holding brake 61 is disposed and attached above the motor 39 and is attached to the support member 51. The holding brake 61 prevents the rotation of the rotary shaft of the motor 39 when the rotation of the motor 39 is stopped and prevents the ball screw 24 from rotating due to the own weight of the control rod 20, thus preventing the control rod 20 from moving down.

When the control rod 20 is withdrawn from the core 6, the motor 39 rotates in a direction capable of withdrawing the control rod 20 in the control rod drive mechanism 21. The rotary power of the motor 39 is transmitted to the outer magnet coupling 40 to rotate the outer magnet coupling 40. When the outer magnet coupling 40 is rotated, the inner magnet coupling 35 disposed in the spool piece 34 is also rotated in the rotation direction of the outer magnet coupling 40. As a result, the rotary shaft 33 is rotated and the ball screw 24 is also rotated in the rotation direction of the outer magnet coupling 40. Since the rotation of the ball nut 26 is prevented by the guide tube 29, the ball nut 26 mating with the ball screw 24 moves downward. The piston tube 23 put on the ball nut 26 moves down and the control rod 20 moves down in the control rod guide pipe 8. Therefore, the control rod 20 is withdrawn from the core 6 and the reactor power increases.

Figure 2:
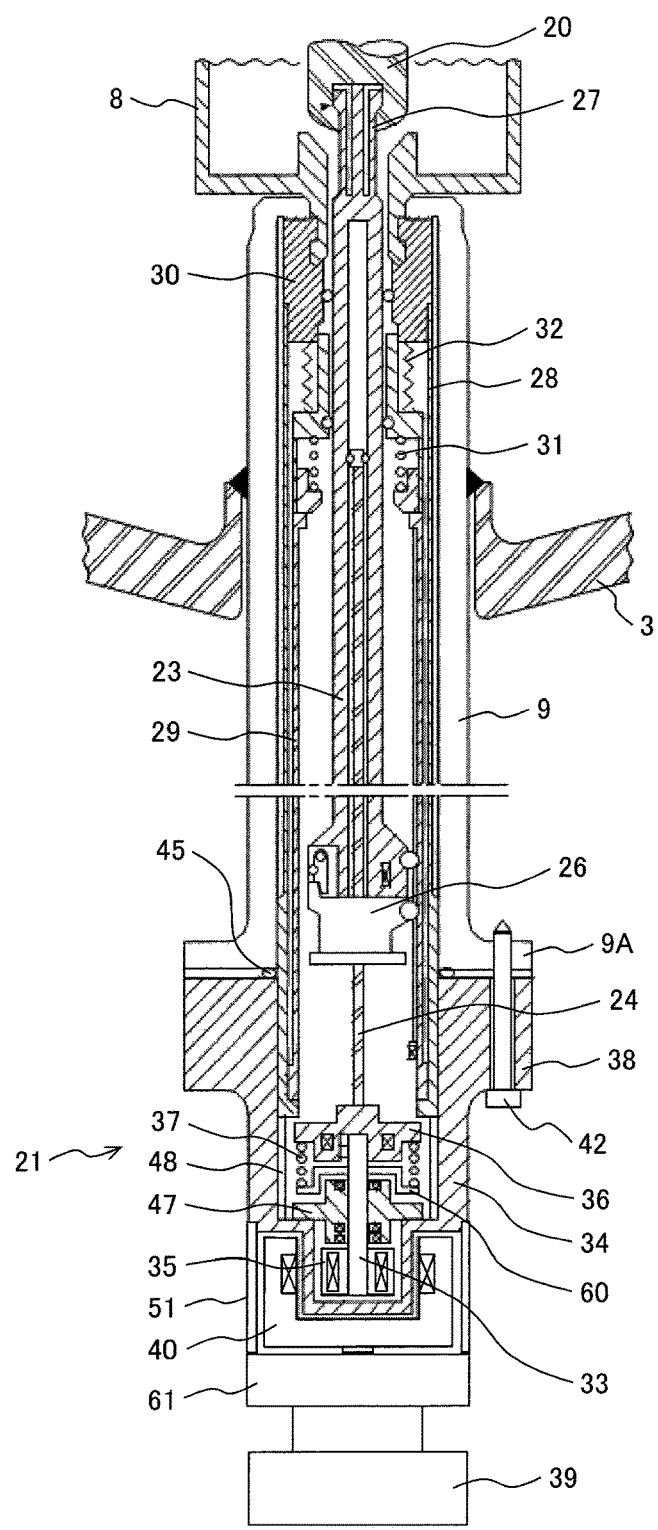
FIG. 2 is a longitudinal cross sectional view showing a control rod drive mechanism according to 1 which is a preferred embodiment of the present invention applied to a boiling water nuclear power generation plant shown in FIG. 1.

Further, the control rod 20 shown in FIG. 2 is withdrawn perfectly from the core 6 and exists in the lowest position.

Figure 5:
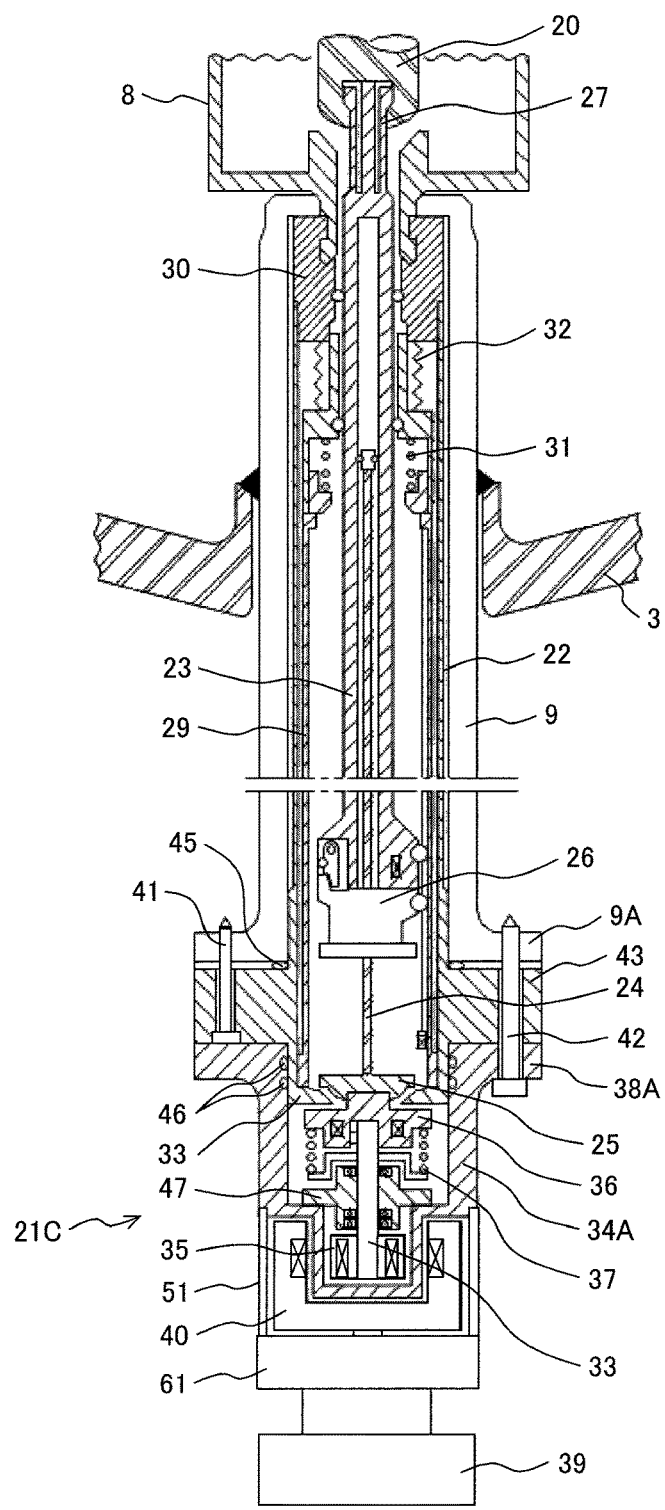
FIG. 5 is a longitudinal cross sectional view showing a conventional control rod drive mechanism.

Here, a conventional control rod drive mechanism 21C will be explained by referring to FIG. 5. Only the portions different from the structure of the control rod drive mechanism 21 of the present embodiment among the structure of the control rod drive mechanism 21C will be explained. In the control rod drive mechanism 21C, a flange 43 in which a part of the outer tube 22 is formed in the lower end portion of the outer tube 22. The flange 43 is attached to a flange 9A of the control rod drive mechanism housing 9 by a bolt 41. A flange 38A of a spool piece 34A is attached to the control rod drive mechanism housing 9 by a bolt 42 passing through the flange 38A of the spool piece 34A and the flange 43 of the outer tube 22. In the control rod drive mechanism 21C, a separation detection structure installed on the control rod drive mechanism 21 includes a gear coupling (a back sheet) 25 and a gear coupling 36. Furthermore, in the control rod drive mechanism 21C, the O-ring 45 made of metal is disposed between the flange 9A and the flange 43 and O-rings 46 made of rubber are disposed between the inner surface of the spool piece 34A and the outer surface of the outer tube 22.

In such a control rod drive mechanism 21C, as aforementioned, even at the time of exchange of the O-rings 46 made of rubber disposed between the outer surface of the outer tube 22 and the inner surface of the spool piece 34A, the bolts 42 for connecting the flange 9A of the control rod drive mechanism housing 9 and the flange 38A of the spool piece 34A need to be removed. Therefore, to confirm the crushing condition of the O-ring 45 made of metal disposed between the flange 9A and the flange 43, the gap between the flange 9A of the control rod drive mechanism housing 9 and the flange 43 of the outer tube 22 needs to be confirmed. In the control rod drive mechanism 21C, the spool piece 34A needs to be removed from the flange 9A of the control rod drive mechanism housing 9 only for the maintenance of the O-rings 46 made of rubber.

The control rod drive mechanism 21 of the present embodiment does not form the flange 43 in the outer tube 28 as the control rod drive mechanism 21C and connects the flange 9A of the control rod drive mechanism housing 9 and the flange 38 of the spool piece 34 by the bolts 42. That is, in the control rod drive mechanism 21, the flange 43 does not exist between the flange 9A and the flange 38. In the control rod drive mechanism 21, the outer tube 28 is disposed only in the control rod drive mechanism housing 9 and the spool piece 34. The outside diameter of the outer tube 28 is smaller than the inside diameter of the spool piece 34 through the entire length of the outer tube 28 and the outer tube 28 is not projected outside the inner surface of the spool piece 34 in the radial direction of the outer tube 28 because the outer tube 28 does not form the flange 43. As a result, in the control rod drive mechanism 21, it becomes unnecessary to dispose the O-rings 46 made of rubber which are a seal member between the outer surface of the outer tube 22 and the inner surface of the spool piece 34 as in the control rod drive mechanism 21C.

As a result, in the control rod drive mechanism 21, the maintenance frequency can be reduced and the time required for maintenance can be shortened compared with the control rod drive mechanism 21C.

In the control rod drive mechanism 21, the flange 43 of the outer tube 28 is unnecessary, so that the sealing places are decreased by one place compared with the conventional control rod drive mechanism 21C and the places capable of leaking cooling water in the reactor pressure vessel 3 is reduced by one place. This leads to the reliability improvement of the boiling water nuclear power generation plant.

In the control rod drive mechanism 21 of the present embodiment, the sealing places are decreased by one place compared with the control rod drive mechanism described in Japanese Patent Laid-Open No. 60(1985)-47987. Namely, in the control rod drive mechanism described in Japanese Patent Laid-Open No. 60(1985)-47987, the seal members need to be disposed between the flange in the upper end portion of the spool piece and the flange of the control rod drive mechanism housing and between the cylinder body attached to the flange in the lower end portion of the spool piece and the flange, respectively. In the control rod drive mechanism 21, a seal member equivalent to the seal member disposed between the flange in the lower end portion of the spool piece in the control rod drive mechanism described in Japanese Patent Laid-Open No. 60(1985)-47987 and the cylinder body is unnecessary. Therefore, the time required for the maintenance of the control rod drive mechanism 21 of the present embodiment becomes shorter than the time required for the maintenance of the control rod drive mechanism described in Japanese Patent Laid-Open No. 60(1985)-47987.

Further, in the present embodiment, the connection of the flange 43 of the outer tube 22 and the flange 9A of the control rod drive mechanism housing 9 by the bolt 41 in the conventional control rod drive mechanism 21C becomes unnecessary, so that the operation of attaching and removing the control rod drive mechanism 21 from the control rod drive mechanism housing 9 for maintenance can be simplified and the time required for this operation can be shortened.

Furthermore, in the control rod drive mechanism 21, the flange 43 is not formed in the outer tube 28 and the exchange of the O-rings 46 made of rubber becomes unnecessary, so that the gear coupling 25 provided for removal of the spool piece 34A and the metal seal by a back sheet 33 formed in the outer tube 22 can be deleted. As a result, the cooling water leakage potential of the control rod drive mechanism 21 can be reduced. Furthermore, the back sheet 33 can also be deleted, so that the number of parts of the control rod drive mechanism 21 can be reduced.

Further, the motor 39 and the holding brake 61 become a subject of maintenance, though the support member 51 is removed from the spool piece 34, thus the maintenance of the motor 39 and the holding brake 61 can be performed easily. When performing the maintenance of the motor 39 and the holding brake 61, there is no need to remove the spool piece 34 from the control rod drive mechanism housing 9. However, when removing the motor 39 and the holding brake 61 from the spool piece 34, the control rod 20 is withdrawn perfectly from the core and the ball nut 26 is positioned at the lowest position so that the ball screw 24 is rotated and the ball nut 26 does not move down due to the own weight of the control rod 20 connected to the piston tube 23.

Figure 3:
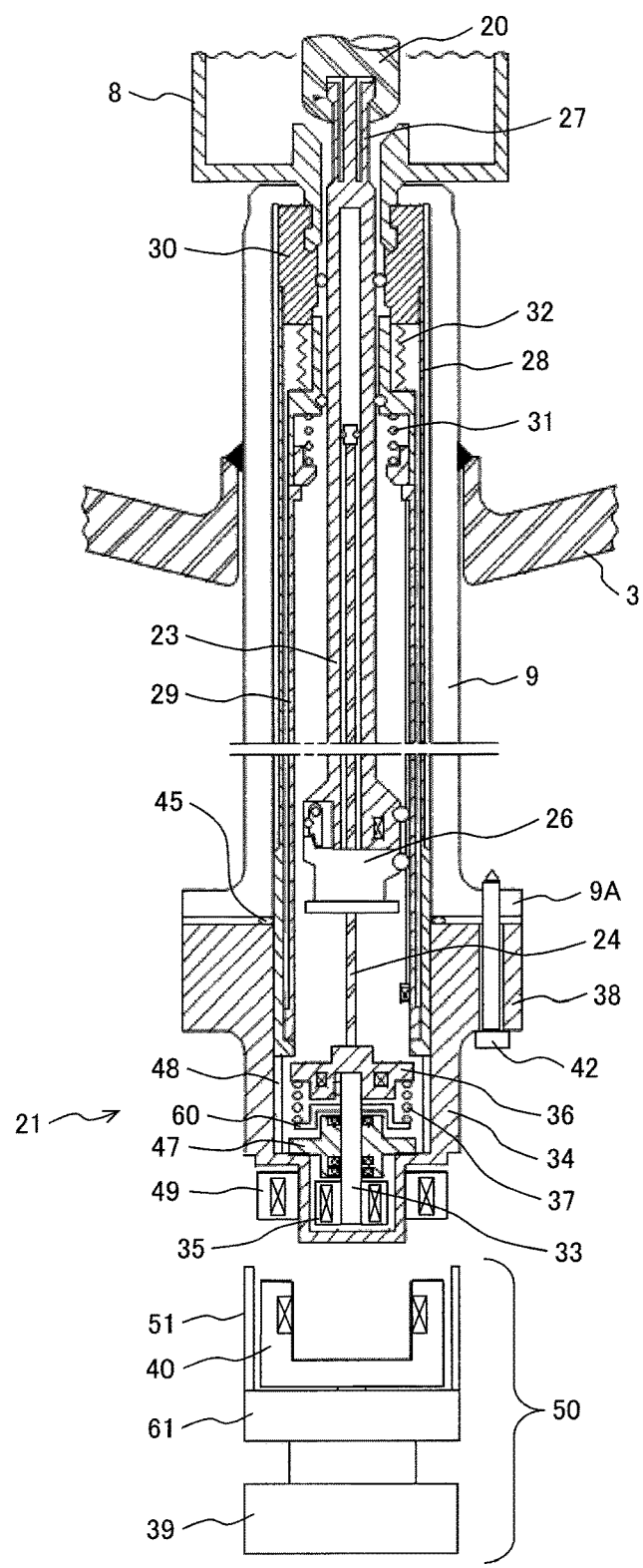
FIG. 3 is an explanatory drawing showing an example of a mechanism of preventing rotation of a ball screw when the motor is removed in a control rod drive mechanism shown in FIG. 1.

When removing a motor portion 50 (refer to FIG. 3) including the motor 39 and the holding brake 61 from the spool piece 34 for maintenance of the motor 39 and the holding brake 61 in the state that the ball nut 26 is not positioned in the lowest position, a rotation prevention magnet 49 is quickly attached to the outer surface of the spool piece 34 after removing the motor 39 and the holding brake 61 from the spool piece 34 (refer to FIG. 3). The rotation prevention magnet 49 is a magnet becoming magnetically paired with the inner magnet of the inner magnet coupling 35. The rotation of the inner magnet coupling 35 due to the own weight of the control rod 20 is prevented by the rotation prevention magnet 49. Therefore, the descent of the control rod 20 is prevented.

In the nuclear power generation plant, even if one control rod 20 is withdrawn perfectly from the core 6, the safety thereof is ensured.

In the control rod drive mechanism 21, the outer tube 28 is supported by the support member 48 disposed in the spool piece 34, though the lower end of the outer tube 28 may be supported directly by the spool piece 34.

Embodiment 2

Figure 4:
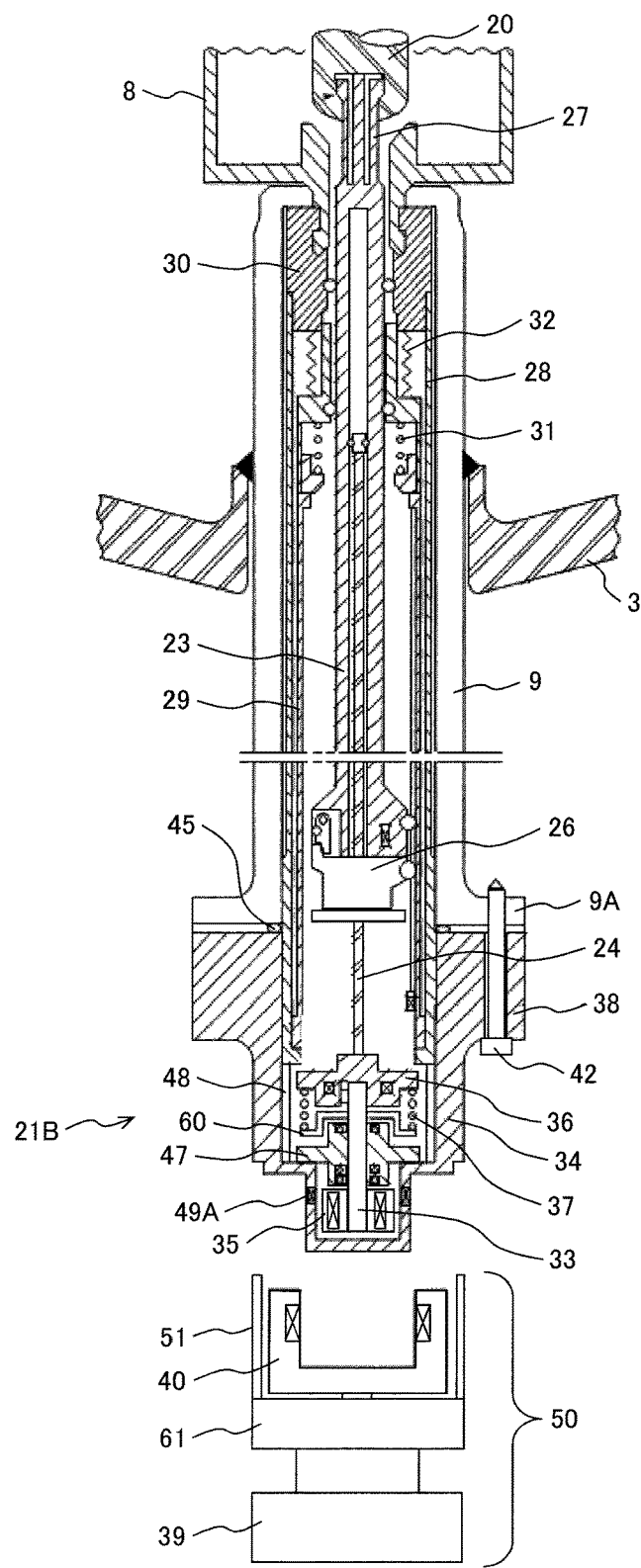
FIG. 4 is a longitudinal cross sectional view showing a control rod drive mechanism according to embodiment 2 which is another preferred embodiment of the present invention.

A control rod drive mechanism according to embodiment 2 which is another preferred embodiment of the present invention will be explained by referring to FIG. 4. A control rod drive mechanism 21B of the present embodiment has a structure that a rotation prevention magnet 49A is added to the control rod drive mechanism 21 according to embodiment 1. The rotation prevention magnet 49A is a magnet becoming magnetically paired with the inner magnet of the inner magnet coupling 35 and is attached to the spool piece 34 in the position opposite to a part of the inner magnet coupling 35. Other structure of the control rod drive mechanism 21B is the same as to that of the control rod drive mechanism 21 of embodiment 1.

In the control rod drive mechanism 21B, when the motor 39 and the holding brake 61 are removed from the spool piece 34 for maintenance, even when the ball nut 26 is not positioned in the lowest position, the rotation of the inner magnet coupling 35 due to the own weight of the control rod 20 is prevented by the rotation prevention magnet 49A because the rotation prevention magnet 49A is installed on the spool piece 34. Therefore, the descent of the control rod 20 is prevented.

The present embodiment can obtain each effect generated in embodiment 1. Furthermore, even when the motor 39 and the holding brake 61 are removed from the spool piece 34 for maintenance in the state that the ball nut 26 is not positioned in the lowest position, in the present embodiment, the rotation of the ball screw 24 due to the own weight of the control rod 20 can be prevented by the action of the rotation prevention magnet 49A installed on the spool piece 34. Therefore, the descent of the control rod 20 can be prevented.

The control rod drive mechanisms of embodiments 1 and 2 can be applied also to the forced circulation boiling water nuclear power generation plant.

REFERENCE SIGNS LIST

1: natural circulation nuclear power generation plant, 2: reactor, 3: reactor pressure vessel, 6: core, 9: control rod drive mechanism housing, 9A, 38: flange, 10: chimney, 20: control rod, 21, 21B: control rod drive mechanism, 23: piston tube, 24: ball screw, 26: ball nut, 28: outer tub, 29: guide tube, 33: rotary shaft, 34: spool piece, 35: inner magnet coupling, 39: motor, 40: outer magnet coupling, 45: O-ring, 49, 49A: rotation prevention magnet, 50: motor portion.

What is claimed is:

1. A control rod drive mechanism comprising:
an outer tube;
a guide tube disposed in said outer tube;
a spool piece in which a lower end portion of said outer tube is inserted, the spool piece supporting said outer tube and said guide tube, wherein
the outer tube and the spool piece are distinct components with at least a portion of the outer tube being located radially inward relative to the spool piece;
an inner magnet coupling disposed in said spool piece;
a ball screw configured to be rotated by said inner magnet coupling and disposed in said guide tube;
a ball nut configured to mate with said ball screw;
a piston tube disposed on said ball nut and connected to a control rod;
a motor disposed below said spool piece and removably attached to said spool piece;
an outer magnet coupling connected to a rotary shaft of said motor and being disposed radially outward of said inner magnet coupling across said spool piece;
a rotation prevention magnet installed on the spool piece radially outward of and in the same radial plane as the inner magnet coupling, wherein
said rotation prevention magnet is configured to magnetically pair with the inner magnet coupling to prevent the descent of the control rod due to the weight of the control rod when said motor is removed from the spool piece.

2. The control rod drive mechanism according to claim 1, further comprising:
a holding brake attached to and above said motor and configured to prevent the rotation of said rotary shaft of said motor when the rotation of said motor is stopped, wherein
the holding brake is also configured to prevent said ball screw from rotating due to the weight of the control rod, thus preventing said control rod from moving downward.

* * * * *